UNITED STATES PATENT OFFICE.

RALPH N. LULEK, OF WILMINGTON, DELAWARE, ASSIGNOR TO E. I. DU PONT DE NEMOURS & COMPANY, OF WILMINGTON, DELAWARE, A CORPORATION OF DELAWARE.

VAT COLORS OF THE 1:9-ANTHRATHIAZOLE SERIES.

No Drawing.   Application filed May 19, 1927.   Serial No. 192,797.

This invention relates to new vat colors of the anthraquinone series, and more particularly it relates to colors of this series varying from greenish-yellow to brown shades.

U. S. Patent to Nawiasky and Saurwein, No. 1,539,689, mentions new vat colors of the type A—CO—NH—A', where A and A' represent an anthraquinone nucleus. According to said patent, these new compounds may be obtained by condensing amino-anthraquinone with beta-carboxylic acid chloride derivatives of anthraquinone substituted in the alpha-position by a chlorine atom or by a group NHR, where R represents a hydrogen atom or a radical other than beta-carboxylic acid of anthraquinone. These vat colors produce shades on cotton from orange to violet but generally yield a red shade.

This invention has as an object the production of vat colors of the anthraquinone series by using the new intermediate 1:9-anthrathiazole-2-carboxylic acid and condensing this intermediate with amino-anthraquinones. The intermediate referred to comprises the subject matter of my co-pending application, Serial No. 176,578, filed March 18, 1927.

I have found that if one molecular proportion of 1:9-anthrathiazole-2-carboxylic acid chloride is condensed with one molecular proportion of a mono-amino-anthraquinone, or with a diamino-anthraquinone in which one amino group is substituted by a benzoyl group, or if two molecular proportions of 1:9-anthrathiazole-2-carbonyl chloride are condensed with one molecular proportion of a diamino-anthraquinone, very valuable new vat colors are obtained, dyeing cotton from greenish-yellow to brown shades.

The compounds formed are of the type A—CO—NH—A' in which A is always the residue of 1:9-anthrathiazole (—CO in 2-position) and A' may be either an anthraquinone residue in which one hydrogen may be replaced by halogen or a diamino-anthraquinone residue in which one amino group may be substituted by a benzoyl residue.

The following examples are given by way of illustration:

Example 1.

Ten parts of 1:9-anthrathiazole-2-carboxylic acid chloride, prepared by boiling 1:9-anthrathiazole-2-carboxylic acid with five parts of thionyl chloride for 20 hours and distilling off the excess, are heated with 7.4 parts of alpha-amino-anthraquinone in 250 parts of nitrobenzene to 160° C. for two hours. The product may be purified by running in chlorine at 160° C. for two hours. It is filtered at room temperature, washed with nitrobenzene and alcohol, and dried.

It shows a greenish-yellow powder and dyes cotton from a dark violet-blue vat in greenish-yellow shades very fast to soaping, light, and chlorine. The solution color in sulphuric acid is cherry red. It is insoluble in alkali, water, and hydrochloric acid. The reaction which takes place may be illustrated by the following formulas:

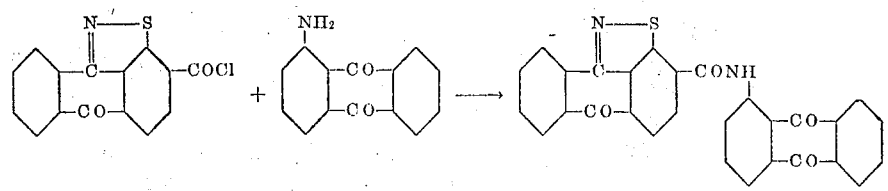

Example 2.

Ten parts of 1:9-anthrathiazole-2-carboxylic acid chloride are heated with 7.4 parts of beta-amino-anthraquinone to 160° C. for two hours in 400 parts of nitrobenzene. The product separates in greenish-yellow crystals and is purified by chlorinating at 160° C. for two hours. After filtering and washing with nitrobenzene and alcohol it shows greenish-yellow needles.

It dyes cotton in greenish-yellow fast shades from a blue hydrosulphite vat. The solution color in concentrated sulphuric acid is red.

The reaction takes place according to the following formulas:

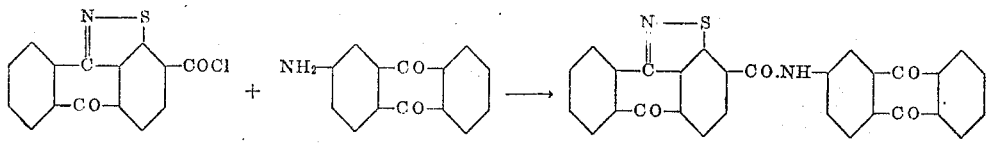

Example 3.

Ten parts of 1:9-anthrathiazole-2-carboxylic acid are heated to about 100° C. with nine parts of phosphorus pentachloride in 400 parts of nitrobenzene for two hours. Then 3.9 parts of 1:5-diamino-anthraquinone are added and the mass stirred at 150° C. for two hours. After purifying the product by running in chlorine at 150° C. for two hours the product is filtered and washed with nitrobenzene and alcohol. It dissolves in concentrated sulphuric acid with red color and dyes cotton from a violet vat in fast yellow shades.

The formation of the dyestuff may be illustrated by the following formulas:

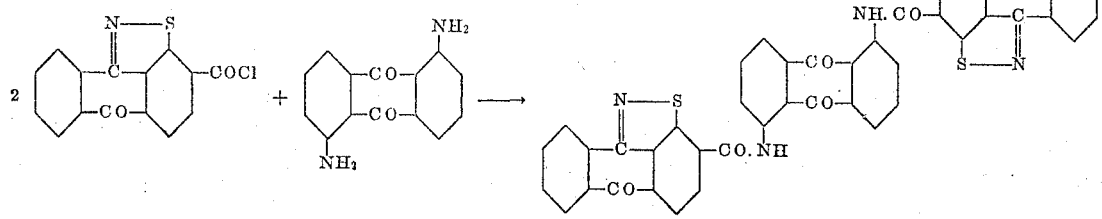

Example 4.

Ten parts of 1:9-anthrathiazole-2-carboxylic acid chloride are heated with 3.9 parts of 1:4 diamine-anthraquinone in 400 parts of nitrobenzene to 160° C. for two hours. The dyestuff separates in reddish-brown crystals and is filtered off, washed with nitrobenzene, and dried. It dyes cotton from a violet-blue vat in yellow-brown shades and dissolves in sulphuric acid with red color. The reaction takes place according to the following formulas:

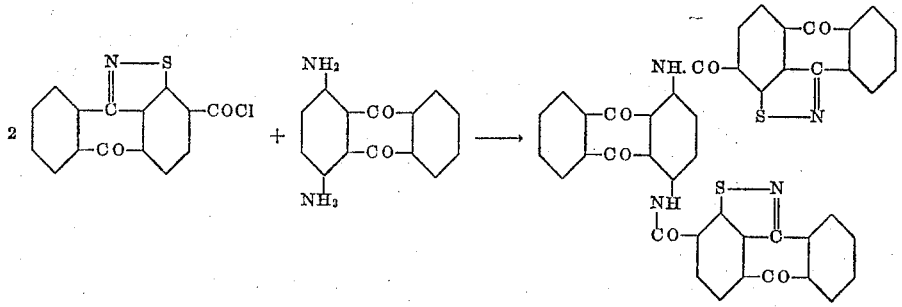

Example 5.

Ten parts of 1:9-anthrathiazole-2-carboxylic acid chloride are heated with 11.4 parts of mono-benzoyl-1:5-diamino-anthraquinone in 400 parts of nitrobenzene to 130° C. for two hours. The dyestuff separates in yellow crystals and is filtered cold, washed with nitrobenzene and alcohol, and dried. It dissolves in sulphuric acid with a cherry red color and dyes cotton from a blue vat in greenish-yellow shades of exceptional fastness properties.

The reaction may be illustrated by the following formulas:—

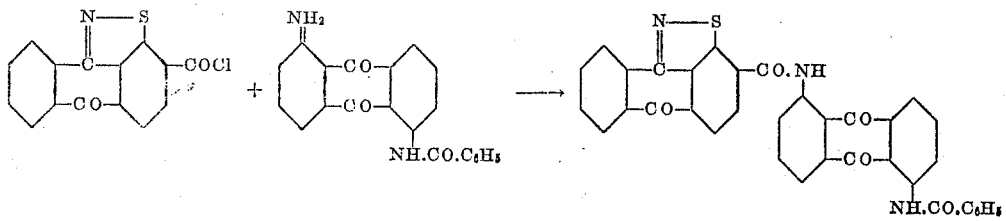

Example 6.

Ten parts of 1:9-anthrathiazole-2-carboxylic acid chloride are heated with 8.6 parts of 1-amino-6-chlor-anthraquinone in 300 parts nitrobenzene to 140° C. for 2 hours. The products separate in greenish-yellow crystals and may be purified by running in chlorine gas at 130° C. After filtering, washing and drying, it appears as a greenish-yellow powder, soluble in conc. sulfuric acid with red color and dyes cotton from a dark blue vat in greenish-yellow shades of exceptional fastness properties.

The reaction which takes place may be illustrated by the following formulas:

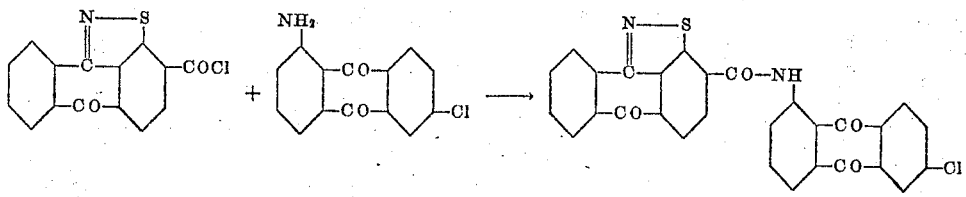

The new vat colors produced according to my invention will dye cotton and artificial silk in shades varying from greenish-yellow to yellow brown, are very fast to washing, and to the action of chlorine, acid, alkali and light, and exhibit generally excellent fastness properties. In most instances these new vat colors discharge with sulphoxite Cl and are suitable for printing.

As many apparently widely different embodiments of this invention may be made without departing from the spirit thereof, it is to be understood that I do not limit myself to the foregoing examples or description except as generally indicated in the following claims.

I claim:

1. A new vat dye of the type

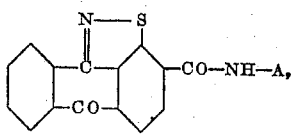

in which A is an anthraquinone residue.

2. A new vat dye of the type

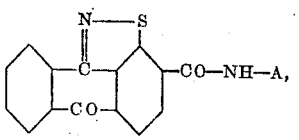

in which A is a substituted anthraquinone residue.

3. A new vat dye of the type

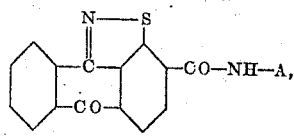

in which A is an anthraquinone residue containing a substituted amino group.

4. A new vat dye of the type

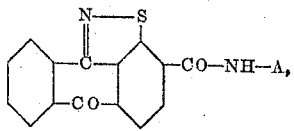

in which A is an anthraquinone residue containing a group —NH—CO—R, R being an organic radicle.

5. A new vat dye having most probably the formula

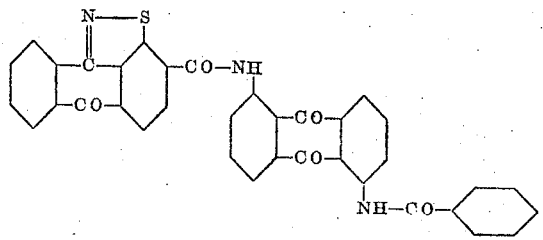

6. Material dyed with the dye of claim 1.
7. Material dyed with the dye of claim 2.
8. Material dyed with the dye of claim 3.
9. Material dyed with the dye of claim 4.
10. Material dyed with the dye of claim 5.

In testimony whereof I affix my signature.

RALPH N. LULEK.